March 23, 1954
F. HANKS, JR
2,672,700
SHELLFISH HARVESTING MACHINE
Filed May 19, 1952
3 Sheets-Sheet 1
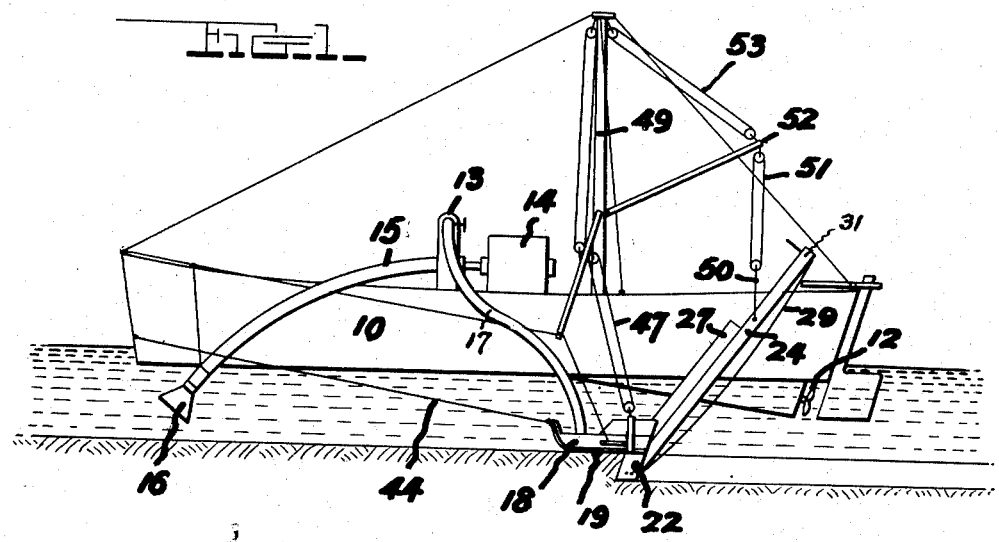
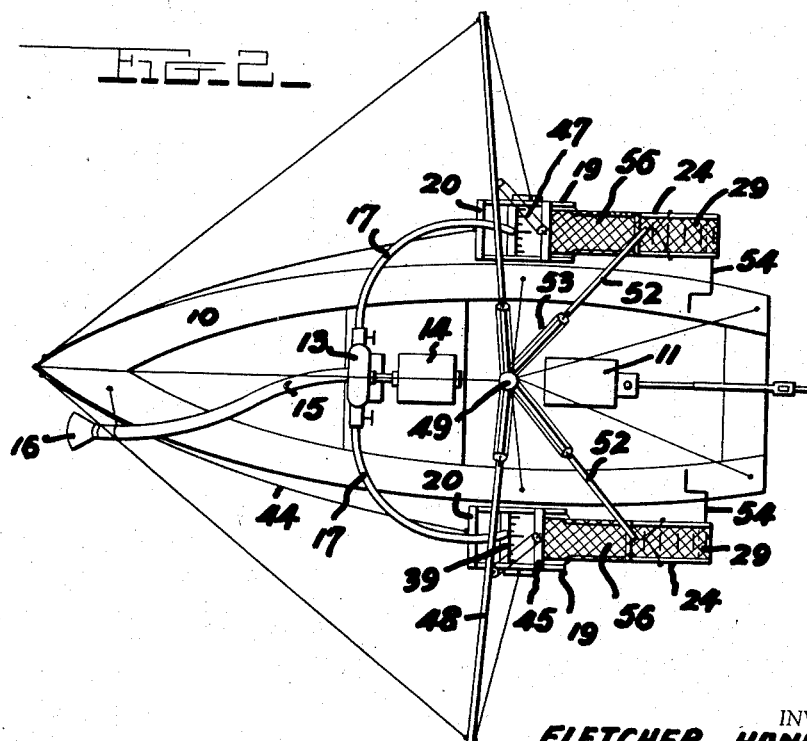
INVENTOR
FLETCHER HANKS, Jr.,
BY
*Dwight R. Brown*
ATTORNEY March 23, 1954
F. HANKS, JR
2,672,700
SHELLFISH HARVESTING MACHINE
Filed May 19, 1952
3 Sheets-Sheet 2
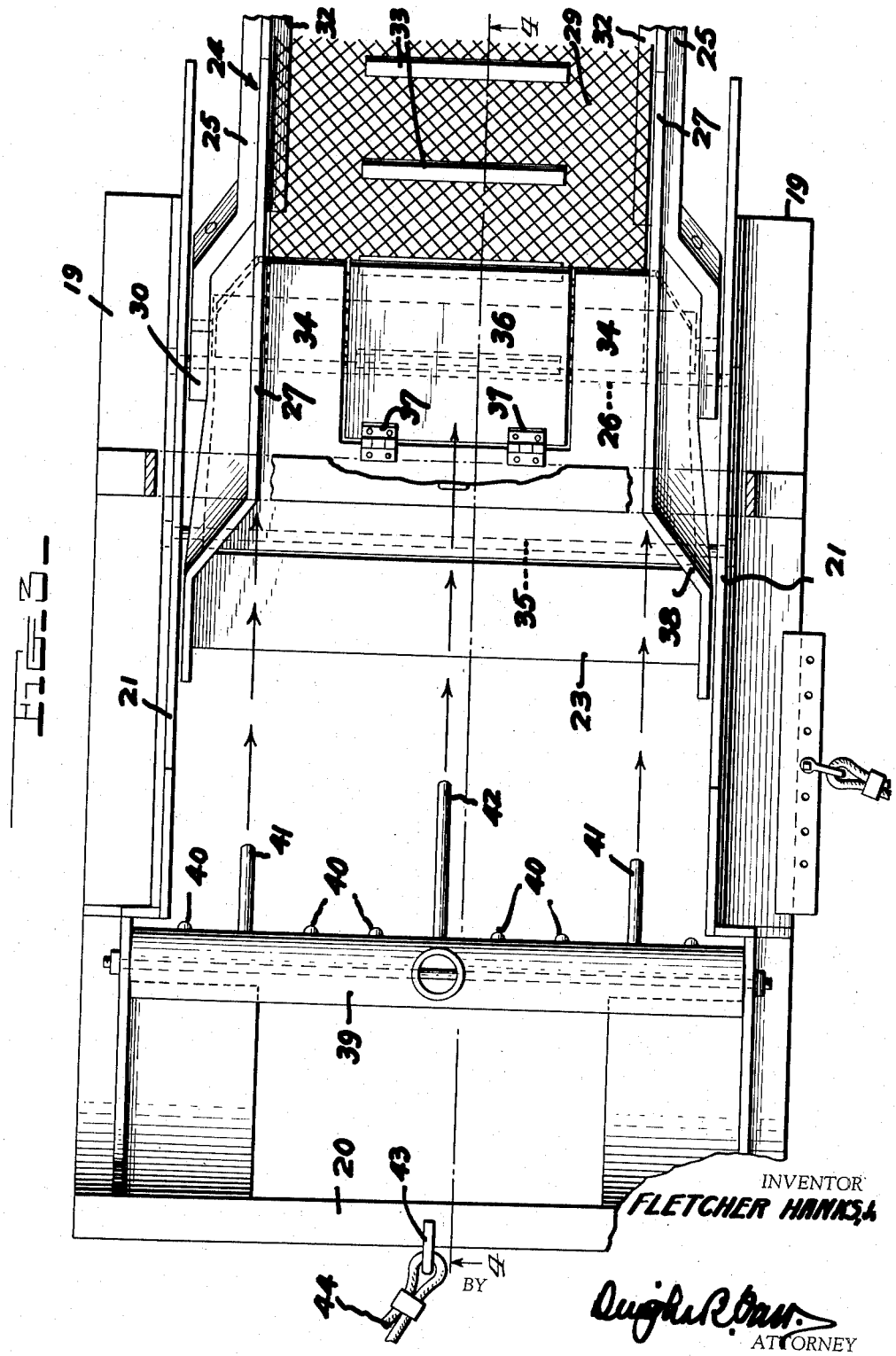
INVENTOR
*FLETCHER HANKS,Jr*
ATTORNEY

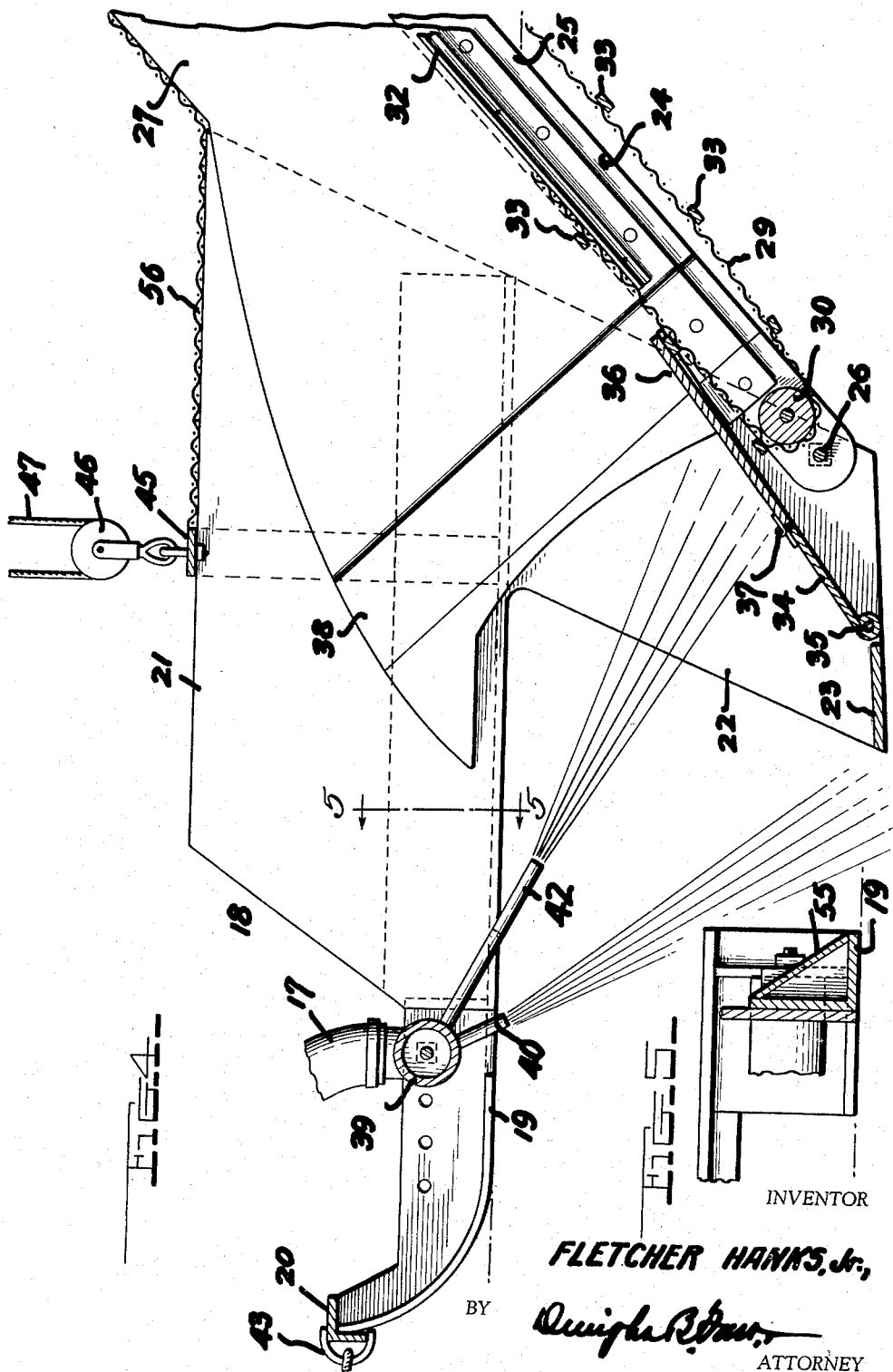

Patented Mar. 23, 1954

2,672,700

UNITED STATES PATENT OFFICE 2,672,700

SHELLFISH HARVESTING MACHINE

Fletcher Hanks, Jr., Easton, Md.

Application May 19, 1952, Serial No. 288,707

14 Claims. (Cl. 37—55)

This invention is a shell fish harvesting machine, adapted particularly for use in the dislodging and gathering of clams or mollusks from their beds in the bottoms of streams, separating them from sand, gravel or mud, and delivering them thoroughly washed and cleaned to a predetermined location.

A particular object of the invention is to provide means of comparatively simple construction which may be moved along the bottom of a stream, bay or sea to quickly, easily and without damage dislodge shell fish embedded in such bottoms, separate, wash and clean the same of foreign matter such as sand, gravel or mud, to deliver the harvested shell fish to a location for easy recovery and handling and at the same time to return to the same location in the stream bottom such sand, gravel or mud as may have been disturbed in the harvesting operation.

These objects, together with others which will appear as the description proceeds, are accomplished by means of the structure hereinafter fully described, illustrated in the drawing, and particularly set forth in the claims.

In the drawings:

Fig. 1 is a side elevation of a conventional form of boat or other craft and showing as applied thereto shell fish harvesting mechanism embodying my invention, Fig. 2 is a top plan view of the construction shown in Fig. 1, Fig. 3 is an enlarged fragmentary top plan view of the scoop and a portion of the conveyor involved in the mechanism, Fig. 4 is a longitudinal sectional view taken substantially upon the line 4—4 of Fig. 3, and Fig. 5 is a detail fragmentary sectional view taken upon line 5—5 of Fig. 4.

In carrying out the invention the shell fish harvesting mechanism is mounted upon a conveyance or supporting vehicle in order that it may be moved along over the shell fish bed to be harvested. In the present instance, a conventional boat, preferably of the flat bottom shallow draft type 10, is employed as the conveyance, but it will be understood that other means may be adopted for the support and advancement of the harvesting mechanism if desired.

The supporting structure or boat is provided with the usual motor 11 for driving the conventional propeller 12. Arranged forwardly of this motor and preferably amidships of the boat is a conventional water pump indicated at 13 operated by motor 14 as shown. The pump 13 has attached thereto a hose 15 which has its intake end 16 disposed overboard in order that clear water may be supplied to the pump when the latter is in operation. The pump also has outlet hoses 17 attached thereto, the purposes of which will be later set forth.

While I have successfully used a single shell fish harvesting device upon one side only of the vessel, it is proposed in this development of my invention to provide a pair of shell fish harvesting devices, one located upon each side of the vessel 10 and in close proximity to the sides thereof, and inasmuch as these devices are identical, only one will be described in detail.

The harvester includes a scoop indicated generally at 18. This scoop includes a pair of spaced parallel supports or runners indicated at 19 connected together at their forward ends by a transverse bar 20. Each runner is provided with an upstanding plate 21 extending from the forepart of the runners to the rear thereof, and these plates also have portions 22 depending therefrom near the rear of the runners. The forward ends of the plates 22 are connected by a transverse horizontally disposed plate 23 constituting a blade, which blade is disposed substantially parallel with the runners 19. It will be noted that the blade 23 is disposed a substantial distance below the runners 19, so that in operation with the runners 19 resting upon the bed of the stream, the blade 23 will be disposed sufficiently far beneath the stream bottom to underlie the shell fish bed upon which the operation takes place.

The scoop 18 is open at its rear end and has pivotally connected therewith a conveyor and collector frame 24. This frame includes a pair of spaced parallel bars 25 which have their forward ends engaged between the depending plates 22 of the scoop and pivoted thereto by the transverse bar or rod 26. It will be observed that the lower ends of the frame bars 25 are disposed near the lower end of the scoop and immediately in the rear of the blade 23.

The collector or conveyor frame 24 also includes side plates 27 which project upwardly in spaced parallelism from the bars 25, and extend forwardly so as to lie between the plates 21—22 of the scoop. It is thus seen that the forward end of the collector or conveyor frame is hinged on a horizontal axis within the rear end of the scoop with the upstanding plates 27 interfitting between the plates 21 of the scoop. The collector frame 24 is provided with a conventional open mesh conveyor 29 which passes over a roller 30 carried at the forward or lower end of the collector frame 24 and over a similar roller mounted upon a transverse shaft 31 at the rear or uppermost end of the conveyor frame. The conveyor frame 24 is sufficiently long to extend upwardly and angularly so as to dispose the upper end thereof above the surface of the water and convenient to be reached from a position with the vessel 10. The open mesh conveyor 29 rides upon the tracks 32 secured upon the inner faces of the plates 27, and this conveyor is of a width so as to properly fit between the spaced parallel upstanding plates 27. The conveyor 29 has applied thereto upon its exterior surface and in spaced relation to one another cross strips or collector bars 33, these strips being somewhat narrower than the overall breadth of the conveyor belt.

Pivotally mounted at its forward end transversely within the scoop and immediately in the rear of the blade 23 is an apron 34 comprising a flat plate extending from its pivot 35 rearwardly and angularly so as to overlie and rest upon the forward end of the conveyor belt 29. The apron 34 is here described as pivotally mounted at its forward end transversely within the scoop. Its purpose is to afford a surface over which shell fish collected within the scoop may readily pass to the conveyor at the rear end of the scoop, and therefore need not necessarily be pivoted at its forward end within the scoop. This apron extends the full width of the scoop as shown in the drawing, and is provided inwardly from its ends with an opening or recess within which fits a hinged bridge plate 36. This bridge plate is of a width substantially equal to or slightly greater than the length of the strips or cleats 33 on the conveyor belt. The plate 36 is hinged to the apron 34 as at 37.

It will be noted, with particular reference to Figs. 2 and 3, that the conveyor frame is somewhat narrower than the scoop, and it will also be observed that the forward ends of the upstanding plates of the conveyor frame are flared outwardly as at 38 to lie adjacent to the upstanding plates 21 of the scoop and between the latter. This spacing of the forward ends of the plate 27 provides in effect a funnel for the conveyor frame.

The scoop 18 has disposed transversely thereof and supported between or by the runners 19 a manifold 39 to which the discharge hose 17 from the pump 13 is connected. This manifold is provided throughout its length with a series of pipes constituting jets 40. The jets 40 of this series may be relatively short as shown and extend in the general direction of the surface of the stream bed. The jets of this series preferably project in a general rearward direction so that streams of water projected therefrom will take a downward and rearward course. The manifold is also provided with additional jets indicated at 41 and 42. The jets 41 are relatively long, and are so located upon the manifold as to project their streams directly against the apron 34 near the sides thereof as shown by the arrows in Fig. 3. The central jet 42 is preferably somewhat longer than the companion jets 41 and is disposed in the longitudinal axis of the scoop and at such angle as to project its stream directly against the hinged plate 36.

The connecting bar 20 at the forward end of the scoop has secured intermediate its ends a bail 43 by means of which a rope or cable 44 may be secured thereto. This cable extends forwardly from the scoop to the bow of the vessel 10 to which it is connected. The scoop, inwardly from its ends, is provided with a cross bar 45, to the medial portion of which is connected a sheave or pulley 46 over which a rope or cable 47 passes. The cable 47 is associated with a boom 48 pivotally connected at its inner end to a mast 49 upon the vessel; the arrangement being such that the scoop, with the conveyor mechanism attached thereto, may be raised or lowered as desired. To further facilitate this operation, as well as to govern the angle at which the conveyor frame 24 will be disposed, a cable 50 connected to the conveyor frame inwardly from its ends is associated with the draft cable 51 connected to a boom 52 also pivoted at its inner end to the mast. A further cable 53 may be connected to the boom 52 and to the top of the mast to assist in the elevating or angle adjusting operations.

With a harvesting mechanism as above described connected to each side of the vessel, adjustments of the cables will be made so that the scoop will rest upon the bottom of the stream or bay so as to be towed by the cables 44. The water pump 13 is set in operation and the vessel will be set in motion so as to move slowly in a forward direction. With the scoop supported by its runners 19 resting upon the bottom, the blade 23 will be disposed a substantial distance below the stream bottom, and water under proper pressure from the nozzles 40—41—42 will be projected downwardly and rearwardly as shown more particularly in Fig. 4. The streams from the jets 40 will agitate the sand or other material within which the shell fish are embedded, and the pressure will be sufficient to bring about a penetration at least as deep as the blade 23. The shell fish will be dislodged and at the same time washed free of sand or other material and will be directed by these jets in a rearward direction and within the lower part of the scoop. Being more or less buoyant, the dislodged shell fish will move into the scoop and onto the apron 34, being propelled thereover by the jets 40—41—34 operating in combination. The conveyor 29 is set in motion, either by power means, if desired, or manually by the cranks as indicated at 54. The shell fish passing onto the conveyor will be caught by the transverse strips or cleats 33 and carried to the top thereof where they may be taken off and collected within the boat. Other material will pass off the end of the conveyor and will drop back into the stream in substantially the same location from which it was removed.

The apron 34 and the pivoted plate 36 associated therewith constitutes a bridge between the blade 23 and the conveyor. The free end of the apron rests upon the side portions of the conveyor and overcomes any tendency of the shell fish being lost by dropping back down the conveyor. The central plate 36 has its free end resting upon the conveyor so as to overlie the cross strips 33 for similar purposes, and the water jet from the elongated nozzle 42 supplies sufficient pressure upon the plate 36 to hold it at all times in close contact either with the belt or with the cross strips 33 carried thereby.

In Fig. 5 of the drawing there is shown a detail sectional view through one of the runners. Runner 19 is of angle construction as shown, and in order to reinforce or strengthen the structure as well as to prevent the accumulation of sand, mud or other foreign matter upon the horizontal portion of the angle, a plate 55 is welded or otherwise bridged across the angle as shown. With this covering secured in a water tight manner upon each runner, an air chamber is provided effecting a buoyancy enabling the collector to be more conveniently and effectively handled.

From the foregoing it is apparent that I have constructed a shell fish harvesting machine which is of comparatively simple construction, easy of operation and which will effectively operate to dislodge the shell fish either upon or below the bottom surface, wash them free of all foreign matter, and deliver them uninjured to the conveyor from which they may be taken at the rear or upper end thereof. By means of the tackle illustrated, it is apparent that accurate adjustments of the apparatus may be readily and easily made, and the angularity of conveyor may equally as well and efficiently be determined. Inasmuch as the fluid jets may create considerable agitation of water within the scoop, the rear end of the latter and the forward end of the conveyor frame is covered with a netting 56 to prevent the loss or escape of any of the shell fish.

It is also obvious that with harvesting mechanism constructed in accordance with this invention, the apparatus may be so adjusted as to depth, and the fluid pressure of the jets may be so controlled as to disturb the stream or bay bottom only to the depth of the shell fish bed, and it is also apparent that with a machine as here disclosed the sand, mud and other material will be deposited in substantially the same location from which it is removed as the apparatus advances.

It will also be understood that the angularity of the jets as here set forth is not necessarily controlling, as the jets may be disposed at any desired angle or in any proper direction to agitate the stream bed to dislodge the shell fish for accumulation in the following scoop.

I claim:

1. In a shell fish harvesting machine, a scoop to travel along a stream bottom, a conveyor frame hingedly connected to the rear end of said scoop, a blade in said scoop in advance of said conveyor frame, a conveyor in said frame having its forward end disposed in the rear of said scoop, an apron extending from said blade to the forward end of said conveyor and resting at its rear end upon said conveyor, and nozzles disposed transversely of said scoop in advance of said blade, and means for supplying fluid under pressure to said nozzles.

2. In a shell fish harvesting machine, a scoop to travel along a stream bottom, a conveyor frame hingedly connected to the rear end of said scoop, a blade disposed transversely of said scoop and in advance of said conveyor frame, a conveyor in said frame having its forward end disposed in said scoop and spaced from said blade, an apron hinged in said scoop adjacent to said blade and resting upon said conveyor, nozzles disposed transversely of said scoop in advance of said conveyor, and means for supplying fluid under pressure to said nozzles.

3. In a shell fish harvesting machine, a scoop to travel along a stream bottom, means for supporting said scoop, a blade carried by said scoop and disposed below said supporting means, a conveyor frame hingedly connected to the rear end of said scoop, a conveyor in said frame having its forward end disposed in the rear of said blade and in substantially the same plane therewith, an apron hinged to said scoop in the rear of said blade and overlying said conveyor, nozzles disposed transversely of said scoop in advance of said blade, and means for supplying fluid under pressure to said nozzles.

4. In a shell fish harvesting machine, a scoop, runners arranged in spaced parallelism upon said scoop to support the same, a blade disposed transversely of said scoop below said runners, a conveyor hingedly connected to said scoop in the rear of said blade, a connecting apron interposed between said scoop and said conveyor, nozzles carried by said scoop in advance of said blade, said nozzles being disposed at such angle as to project streams of fluid in the direction of said blade, and means for supplying fluid under pressure to said nozzles.

5. In a shell fish harvesting machine, a scoop to travel along a stream bottom, a conveyor frame communicating at its forward end with the rear end of said scoop, means whereby said frame may be adjusted angularly with respect to said scoop, a conveyor in said frame, a blade on said scoop disposed transversely thereof and in advance of said conveyor, an apron hingedly connected in said scoop in the rear of said blade and having its free end overlying said conveyor, a manifold supported by said scoop in advance of said blade, nozzles projecting from said manifold and directed toward said blade, and means for supplying fluid under pressure to said manifold.

6. In a shell fish harvesting machine, a pair of runners arranged in spaced parallel relationship, plates depending from the rear ends of said runners, a blade connecting the lower ends of said plates, a conveyor frame pivotally connected at one end to said plates and between the latter in the rear of said blade, an apron extending between said plates and hingedly connected thereto in the rear of said blade, the free end of said apron extending into said conveyor frame, and a conveyor in said frame underlying and supporting said apron.

7. In a shell fish harvesting machine, a pair of runners arranged in spaced parallel relationship, plates secured to and depending from the rear portions of said runners, a blade connecting the lower ends of said plates and disposed in substantial parallelism with said runners and below the same, a manifold connecting said runners in advance of said plates, an apron pivoted at its forward end between said plates and in the rear of said blade, a conveyor, one end of said conveyor disposed between said plates and in the rear of said blade, and nozzles connected to said manifold at such angles as to project fluid streams therefrom against said blade and said apron.

8. In a shell fish harvesting machine, a scoop to travel along a stream bottom, a blade carried by said scoop, a conveyor having its forward end disposed in the rear of said scoop, an apron hingedly connected to said scoop in the rear of said blade and adjacent thereto, said apron extending to and overlying said conveyor, said apron having a cut-away portion therein, a plate hingedly connected to said apron and disposed in said cutaway portion, nozzles disposed transversely of said scoop in advance of said blade, said nozzles directed into said scoop and against said apron and said plate, and means for supplying fluid under pressure to said nozzles.

9. In a shell fish harvesting machine, a scoop to travel along a stream bottom, a pair of plates arranged in spaced parallelism and depending from said scoop, a transverse blade connecting the lower ends of said plates, an apron hinged between said plates at one end in the rear of said blade, a conveyor frame pivoted between said plates in the rear of said blade, an endless conveyor in said frame having its upper flight underlying the free end of said apron, a manifold in said scoop disposed transversely thereof, nozzles projecting from said manifold, some of said nozzles directed against said blade, some of said nozzles directed against said apron, and means for supplying fluid under pressure to said manifold.

10. In a shell fish harvesting machine, a scoop comprising a pair of spaced parallel runners, a manifold extending transversely of said scoop and adjacent the forward ends of said runners, plates depending from said runners in spaced parallelism, a blade connecting the lower ends of said plates and having its transverse axis disposed substantially parallel to said runners, a conveyor frame hingedly connected at its forward end between said plates and in the rear of said blade, a conveyor in said frame, an apron pivoted at its forward end between said plates and extending rearwardly therefrom to overlie said conveyor, said apron having a cut-away portion intermediate the ends thereof, a bridge plate hinged at one end to said apron and disposed within said cut-away portion and resting at its free end upon said conveyor, jets projecting from said manifold toward said blade and toward said apron and bridge plate, and means for supplying fluid under pressure to said manifold.

11. In a shell fish harvesting machine, a pair of runners arranged in spaced parallelism, plates connected to said runners and extending above and below the same, a blade disposed transversely between and connecting the lower ends of said plates, a conveyor frame hinged at its forward end between said plates and in the rear of said blade, a conveyor in said frame, side plates connected to said conveyor frame and extending upwardly therefrom and disposed between the said first mentioned plates, an apron hinged between the lower ends of the first mentioned plates in the rear of said blade and having its free end overlying said conveyor, a manifold connecting said runners in advance of said blade, nozzles projecting from said manifold toward said blade and toward said apron, and means for supplying fluid under pressure to said manifold.

12. In a shell fish harvesting machine, a scoop open at its front and rear ends and adapted to travel along a stream bottom, a blade in said scoop intermediate the ends and disposed transversely thereof, a manifold disposed transversely of said scoop and in advance of said blade, a conveyor frame hinged at its forward end within the rear end of said scoop and adjacent to said blade, an endless conveyor in said frame, cleats disposed transversely of said conveyor, an apron hingedly connected at one end within said scoop in the rear of and adjacent said blade and having its free end projected within said conveyor frame, a plate hinged to said apron and resting at its free end upon said conveyor, side plates upon said conveyor frame fitting within said scoop, nozzles connected to said manifold and directed toward said blade, said apron and said hinged plate, and means for supplying fluid under pressure to said manifold.

13. In a shell fish harvesting machine, a pair of spaced parallel interconnected runners to travel along and rest upon a stream bottom, a scoop carried by and having its forward edge disposed below said runners, the said forward edge of said scoop disposed rearwardly of the forward ends of said runners, a conveyor frame hingedly connected at its forward end in the rear end and above the bottom of said scoop, nozzles supported by said runners in advance of the forward ends of said scoop, said nozzles directed downwardly and in a rearward direction to project jets forwardly of as well as into said scoop, and means for supplying fluid under pressure to said nozzles.

14. In a shell fish harvesting machine, a pair of spaced parallel runners to rest upon and travel along a stream bottom, a scoop interposed between and supported by said runners, a blade member at the forward end of said scoop disposed transversely between said runners with its forward edge disposed rearwardly of the forward ends of said runners and with said edge disposed a predetermined distance below the latter, conveyor means communicating with the rear end of said scoop to receive material therefrom, nozzles disposed transversely of said scoop in advance of and above said blade, and means for supplying fluid under pressure to said nozzles.

FLETCHER HANKS, Jr.

References Cited in the file of this patent

UNITED STATES PATENTS

| Number | Name | Date |
|---|---|---|
| 897,351 | Collier | Sept. 1, 1908 |
| 991,333 | Lybeck | May 2, 1911 |
| 1,486,485 | Frissell | Mar. 11, 1924 |
| 2,288,701 | Heden | July 7, 1942 |